March 6, 1928.                                                     1,661,622
H. PIEPER
BRAKE SYSTEM FOR VEHICLES RUNNING ON RAILS
Filed April 15, 1926          2 Sheets-Sheet 1
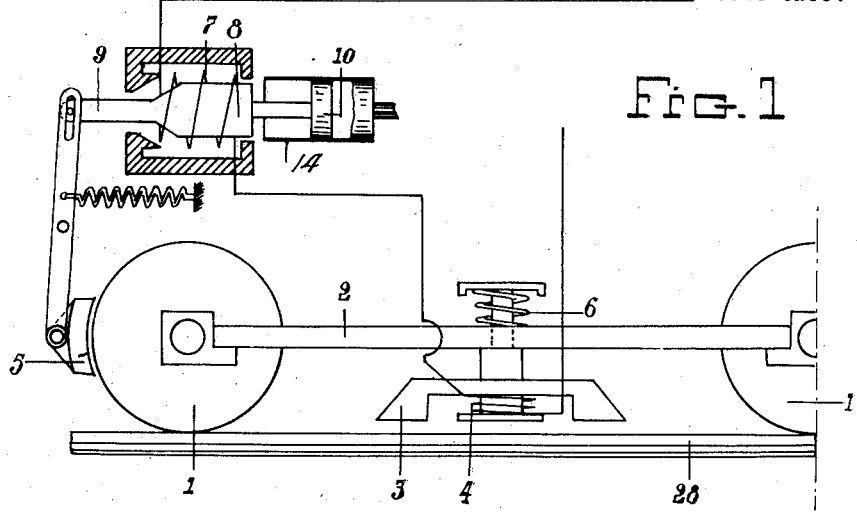
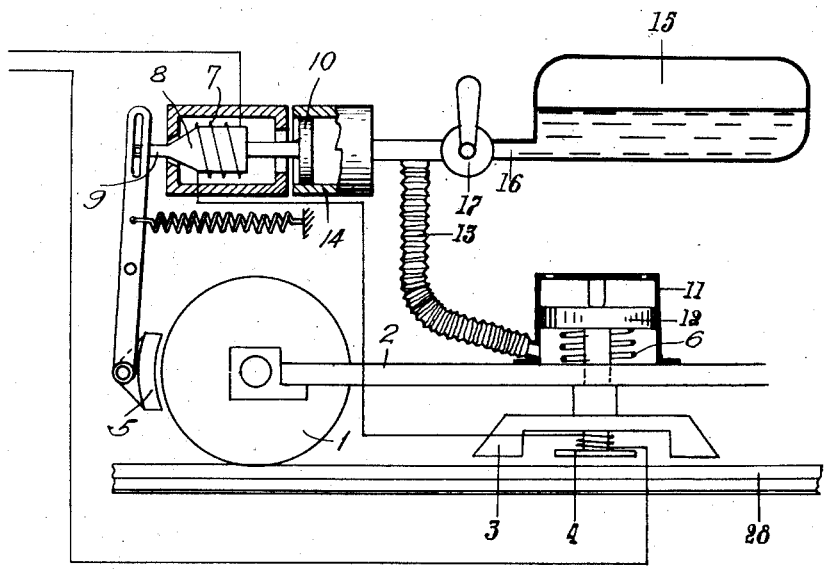
Inventor:
Henri Pieper
By
Attorney March 6, 1928.
H. PIEPER
1,661,622
BRAKE SYSTEM FOR VEHICLES RUNNING ON RAILS
Filed April 15, 1926 2 Sheets-Sheet 2
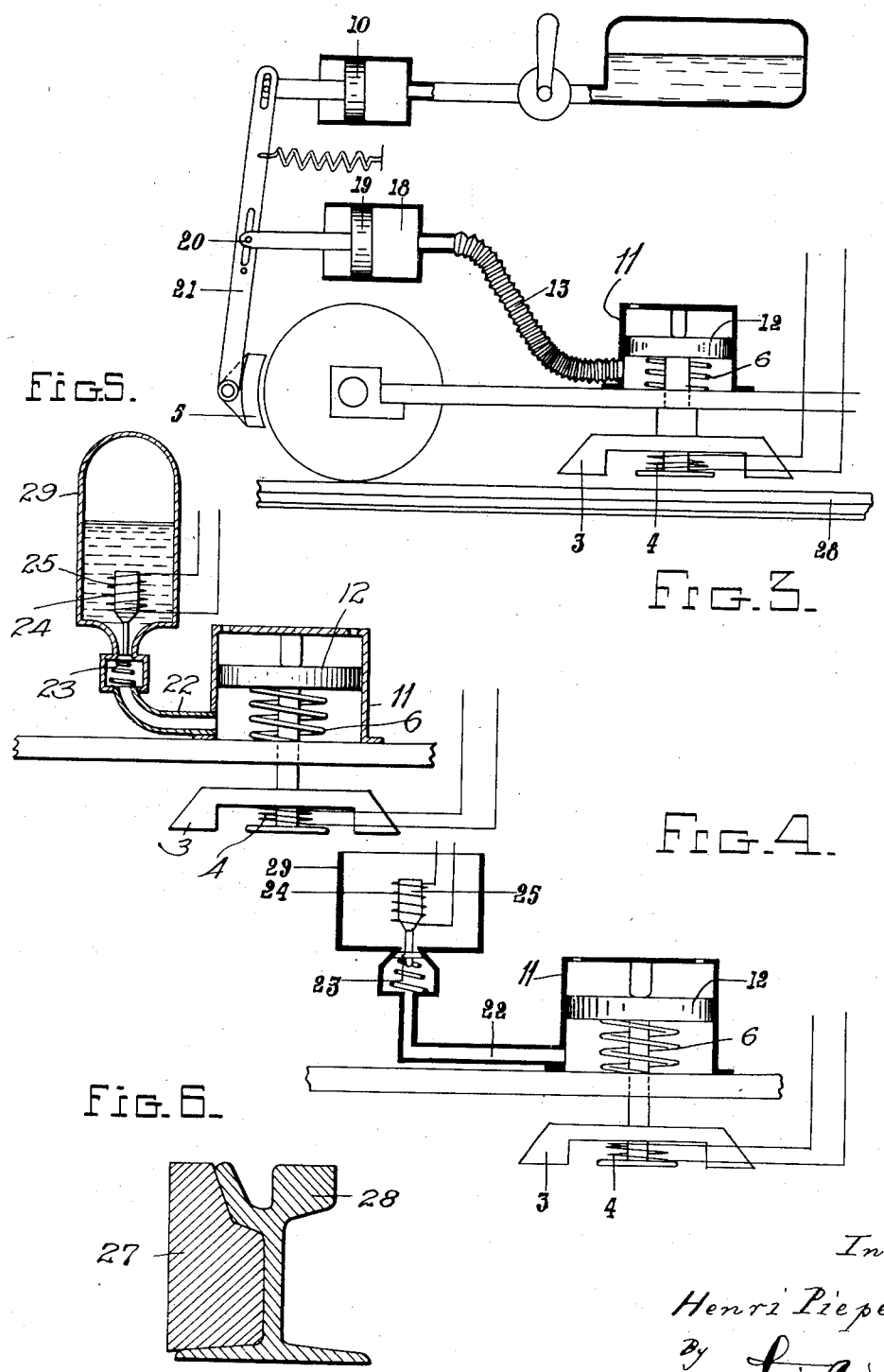
Inventor:
Henri Pieper
By
Attorney.

Patented Mar. 6, 1928.

1,661,622

UNITED STATES PATENT OFFICE.

HENRI PIEPER, OF BRUSSELS, BELGIUM, ASSIGNOR TO COMPAGNIE INTERNATIONALE DES FREINS AUTOMATIQUES, SOCIETE ANONYME, OF LIEGE, BELGIUM.

BRAKE SYSTEM FOR VEHICLES RUNNING ON RAILS.

Application filed April 15, 1926, Serial No. 102,181 and in Belgium September 14, 1925.

This invention relates to the braking of vehicles running on rails and travelling upon tracks in which there are steep gradients, in which connection use is generally made of electromagnetic shoes rubbing upon the rails, such brake system presenting the following disadvantages:
1. An excessive wear of the rails.
2. A great expense of upkeep.
3. Lack of adaptability to be regulated.

The present invention comprises devices which remove the known disadvantages and considerably increase the braking safety upon lines in which there are steep gradients.

These devices consist in a combination of the ordinary brakes provided with shoes with one or more electromagnets arranged in such a way as to increase the adherence of the wheels upon the rails by magnetic attraction.

In this way it is possible to maintain a sufficient braking force by means of the shoes even in the case of wet or greasy rails.

The electromagnetic system may be constructed in such a way as to be able, in case of danger, to act at the same time upon the rails by friction.

The parts may be so combined that the pressure of the shoes upon the wheels increases automatically in proportion as the adherence increases, and this is obtained in such a way that the wheels cannot become jammed and skid.

In order to be able to exert a sufficient magnetic pressure upon the rails it is at present necessary, in view of the insufficiently large section of the rails to allow the passage of the magnetic flux, to increase the number of magnetic poles of the electromagnets, which complicates the windings and lengthens the electromagnets.

In order to obviate this disadvantage and to allow use to be made of electromagnets having a small number of pole pieces, for example two, the invention provides for an increase in section of the rails or the use of a special rail made of steel of large section placed in the centre of the track.

The accompanying drawings illustrate diagrammatically by way of example some forms of the invention.

In these drawings:

Figure 1 is a view of one form.

Figure 2 shows a second form.

Figures 3, 4 and 5 relate to further modified forms.

Figure 6 is a sectional view of a rail provided with an attachment for increasing the cross-sectional area presented for the passage of the magnetic flux.

In the case shown in Figures 1 and 2 a longitudinal member 2 takes support upon the axles of the wheels 1. This longitudinal member carries an electromagnet 4 the pole pieces 3 of which are maintained at a small distance from the track rail 28, for example about 1 centimetre.

When a current of electricity is passed into the said electromagnet the latter is attracted towards the rail 28, the effect of which is to exert pressure in a downward direction upon the longitudinal member 2 and the wheel axles, the result being an increase in the adherence between the wheels 1 and the rail 28. In consequence, the braking force upon the wheels 1 produced by means of the shoes 5 may be increased without any risk of the said wheels skidding.

The electromagnet 4 may be carried by the longitudinal member 2 with the interposition of a spring 6 which is formed in such a way as to be capable of withstanding without yielding a pressure which corresponds to the magnetic attraction normally employed with a view to increasing the adherence. For the whole of a vehicle this increase in adherence may correspond to an increase of the order of weight of several tons. Once the attraction exerted upon the electromagnet 4 has passed beyond the value corresponding to the tension of the spring, the latter will yield and the pole pieces 3 of the electromagnet will become pressed upon the rail.

The result of this pressure of the pole pieces 3 upon the rail will be the imposition of an additional braking force upon the rail, said force acting to effect braking frictionally in the ordinary manner; but it will be understood that such auxiliary or supplemental braking action will be used only in case of emergency.

In the usual case, use will continue to be made of brake shoes, the efficiency of which may be very high on account of the increased adherence. A device is also provided for increasing the pressure of the shoes upon the wheels in proportion as the adherence increases; and for this purpose a solenoid 7 may be employed which acts upon a plunger core 8 provided for example upon the rod 9 of the piston 10 connected to the brake mechanism, the solenoid operating in such a way as to strengthen the force exerted by the piston 10 upon the brake mechanism and being put in series with the electromagnet 4, as shown.

Figure 2 also shows an arrangement in which the liquid contained in a cylinder 11 may be caused to act in the same direction as the suspension spring 6 of the magnet 4, said cylinder 11 having disposed within it a movable piston 12 secured to said magnet. This cylinder is placed in communication through a duct 13 with the brake cylinder 14 in which moves the piston 10 connected to the brake mechanism.

When the pressure upon spring 6, due to the attraction of the electromagnet 4, exceeds a certain value the piston 12 moves towards the rail and forces the liquid ahead of it either into the cylinder 14 in such a way as to increase at this moment the intensity of the braking force, or into the reservoir 15 wherein a certain quantity of said liquid is stored, according to the position of the multiple-way controlling valve 17 located at the intersection of the ducts 13 and 16. Normal braking may be obtained by means of the same liquid, this liquid being under pressure on account of the presence of compressed air contained in the reservoir 15. Said reservoir is connected to the cylinder 14 by the duct 16 mentioned above which is controlled by valve 17, which enables the braking force to be regulated at the will of the operator.

In the case shown in Figure 3 the duct 13 leading from the cylinder 11 opens into a cylinder 18 in which moves the piston 19 connected to the point of pivotal connection 20 of the lever 21 of the brake mechanism. This lever 21 is connected at one end to the shoe 5 and at the other end to the piston 10 upon which is exerted the usual braking force.

When the electromagnet 4 is attracted by the rail the liquid is forced through the duct 13, shifts piston 19 to the left and thus displaces the point 20 in such a way as to vary the action of the shoe 5 upon the wheel.

In the case shown in Figure 4 the liquid contained in the cylinder 11, which liquid serves to maintain the pole pieces 3 of the electromagnet 4 at a certain distance from the track in spite of the attraction they undergo towards it, is prevented from flowing beyond the duct 22 by a valve 23 which is only opened at the moment at which it is desired that the pole pieces 3 shall rub upon the rail; at normal times the valve 23 is retained upon its seat by a spring of suitable strength. The opening of this valve may be controlled electromagnetically by means of the solenoid 24 acting upon a core 25 to which the said valve is rigidly connected, thus putting the duct 22 into communication with the vessel 29 which is open to the atmosphere.

As soon as this communication is effected the increase in adherence produced by the electromagnet ceases and the latter then acts only by friction upon the rail.

The form of construction shown in Figure 5 only differs from the previous one in that the vessel 29 contains a liquid under pressure, so that when the valve 23 opens, the pole pieces of the electromagnet may be attracted towards the rail while maintaining an increase in adherence depending upon the pressure existing in the vessel 29.

In the case shown in Figure 4 the spring 6 acts upon the electromagnet 4 in such a way as to bring it back into its normal position as soon as the action of the electromagnet 4 ceases, and the liquid previously forced into the vessel 29 re-enters the cylinder 11.

In order to allow use to be made of a small number of electromagnets, one, for example, so as to produce, in consequence, a large magnetic flux, the invention contemplates the provision of an attachment 27 (Fig. 6) for the rails to increase the cross-sectional area presented for the passage of the flux, such members being made of magnetic metal and secured to the rails in such a way as to allow the flux to pass through them.

The invention also provides for making the electromagnets act upon members made of a magnetic metal arranged along the track, for example at the centre of the latter, instead of making them act magnetically upon the rail.

Naturally the forms illustrated in the drawings are only given by way of example and the invention consists in employing, in combination with brakes provided with shoes, electromagnets acting upon the rails by magnetic attraction and maintained at a certain distance from the latter in such a way as to increase the adherence of the wheels upon the rails, the pole pieces of the electromagnets being also adapted, in case of emergency, to be applied upon the rails and further increase the braking force.

What I claim is:

1. In a brake system for a vehicle running on rails, an electromagnet suspended above the rails and through which the magnet circuit is closed, the electromagnet being carried through the medium of a piston moving in a cylinder containing a liquid under pressure.

2. In a brake system for a vehicle running on rails, an electromagnet suspended above the rails and through which the magnet circuit is closed, the electromagnet being carried through the medium of a piston moving in a cylinder containing a liquid under pressure, a piston connected with the brake mechanism and movable in a second cylinder, and a duct connecting said second cylinder with the cylinder containing liquid under pressure in such a way that the said liquid displaces the brake mechanism towards braking position when the electromagnet is attracted towards the rails.

3. In a brake system for a vehicle running on rails, an electromagnet suspended above the rails and through which the magnet circuit is closed, the electromagnet being carried through the medium of a piston moving in a cylinder containing a liquid under pressure, a piston connected with the brake mechanism and movable in a second cylinder, a duct connecting said second cylinder with the cylinder containing liquid under pressure in such a way that the said liquid displaces the brake mechanism towards braking position when the electromagnet is attracted towards the rails, a vessel containing liquid and gas under pressure, a duct connecting said vessel with the aforesaid second cylinder that contains the piston connected to the brake mechanism in order to displace said brake mechanism towards braking position, and a closing member interposed between the second cylinder and vessel.

4. In a brake system for a vehicle running on rails, an electromagnet suspended above the rails and through which the magnet circuit is closed, means acting in opposition to the magnetic attraction for maintaining the electromagnet at a determined distance from the said rails, a magnetic member connected to the brake mechanism and adapted to displace the same towards braking position, and a winding on said magnetic member connected with the electromagnet for actuating the former.

5. In a brake system for a vehicle running on rails, an electromagnet suspended above the rails and through which the magnet circuit is closed, the electromagnet being carried through the medium of a piston moving in a cylinder containing a liquid under pressure, a vessel, a duct connecting said vessel with the cylinder, and a valve controlling the duct.

6. In a brake system for a vehicle running on rails, an electromagnet suspended above the rails and through which the magnet circuit is closed, the electromagnet being carried through the medium of a piston moving in a cylinder containing a liquid under pressure, a closed vessel, a duct connecting said vessel with the cylinder, and a valve controlling the duct.

7. In a brake system for a vehicle running on rails, an electromagnet suspended above the rails and through which the magnet circuit is closed, means acting in opposition to the magnetic attraction for maintaining the electromagnet at a determined distance from the said rails and additional members made of magnetic metal applied against the rails to increase the cross sectional area presented for the passage of the magnetic flux.

8. In a brake system for a vehicle running on rails, an electromagnet suspended above the rails and through which the magnet circuit is closed, a cylinder containing a liquid under pressure, a movable piston in said cylinder acting on the liquid therein and carrying the electromagnet, and a spring in the cylinder for normally holding the piston raised, said spring being capable of withstanding without yielding a predetermined pressure imposed upon it by the piston consequent upon the attraction of the magnet.

9. In a brake system for a vehicle running on rails, an electromagnet suspended above the rails and through which the magnet circuit is closed, means acting in opposition to the magnetic attraction for maintaining the electromagnet at a determined distance from said rails, and a piston connected with the braking mechanism and movable in a cylinder adapted to receive liquid under pressure so as to shift said piston in a direction to displace said braking mechanism toward braking position.

10. In a brake system for a vehicle running on rails, an electromagnet suspended above the rails and through which the magnet circuit is closed, means acting in opposition to the magnetic attraction for maintaining the electromagnet at a determined distance from said rails, a piston connected with the braking mechanism and movable in a cylinder adapted to receive liquid under pressure so as to shift said piston in a direction to displace said braking mechanism toward braking position, a magnetic member interposed between and connected with the piston and the braking mechanism, and a winding on said magnetic member connected with the electromagnet for actuating the former.

In testimony whereof I affix my signature.

HENRI PIEPER.